United States Patent [19]

McReynolds

[11] 3,939,771

[45] Feb. 24, 1976

[54] SEISMIC EXPLOSIVE CHARGE LOADER AND ANCHOR

[76] Inventor: Oliver B. McReynolds, P.O. Box 1235, Palestine, Tex. 75801

[22] Filed: June 3, 1974

[21] Appl. No.: 475,521

[52] U.S. Cl.............................. 102/21.8; 403/361
[51] Int. Cl.²......................................... F42B 3/20
[58] Field of Search.................. 102/21.6, 21.8, 24; 403/361

[56] References Cited
UNITED STATES PATENTS

| | | | |
|---|---|---|---|
| 2,784,015 | 3/1957 | Swanson | 403/361 |
| 3,185,091 | 5/1965 | Hamilton | 102/24 |
| 3,208,381 | 9/1965 | Kihlström et al. | 102/21.8 |
| 3,276,371 | 10/1966 | Newman et al. | 102/24 |
| 3,280,742 | 10/1966 | Babb | 102/21.8 |

*Primary Examiner*—Verlin R. Pendegrass
*Attorney, Agent, or Firm*—James F. Weiler; William A. Stout; Dudley R. Dobie, Jr.

[57] ABSTRACT

A seismic explosive charge loader and anchor is disclosed for loading and anchoring explosives in conventional containers, such as cylindrical packages and cans provided with projecting circumferential rims. The loader includes a first tubular member having an upwardly facing internal recess of sufficient diameter to loosely receive a loading pole or loading weight, and a second tubular member having a downwardly facing internal recess of sufficient diameter to fit about and receive the explosive container. A plurality of inwardly and upwardly tapered resilient gripping ribs are disposed in the internal recess and are arranged to grip smooth sides of the cylindrical explosive container and thereby securely hold it in the loader. The ribs are provided with an internal and circumferentially extending groove which receives and grips the circumferential rim or projection of the can type explosive containers. The second tubular member has an enlarged shoulder provided with an opening through it for insertion of an electric blasting cap and lead to the explosive and the central portion of the body has transversely extending appurtures therethrough through which anchor wires are disposed and which extend upwardly and outwardly for anchoring the loader in the bore hole. The loader and anchor is used with conventional wood loading poles or loading weights, wire explosion leads and the like.

6 Claims, 7 Drawing Figures

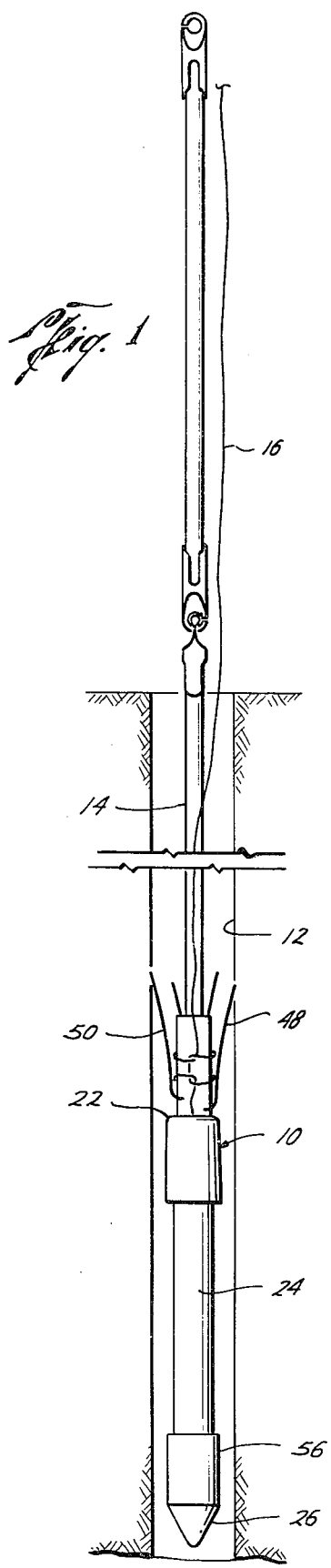
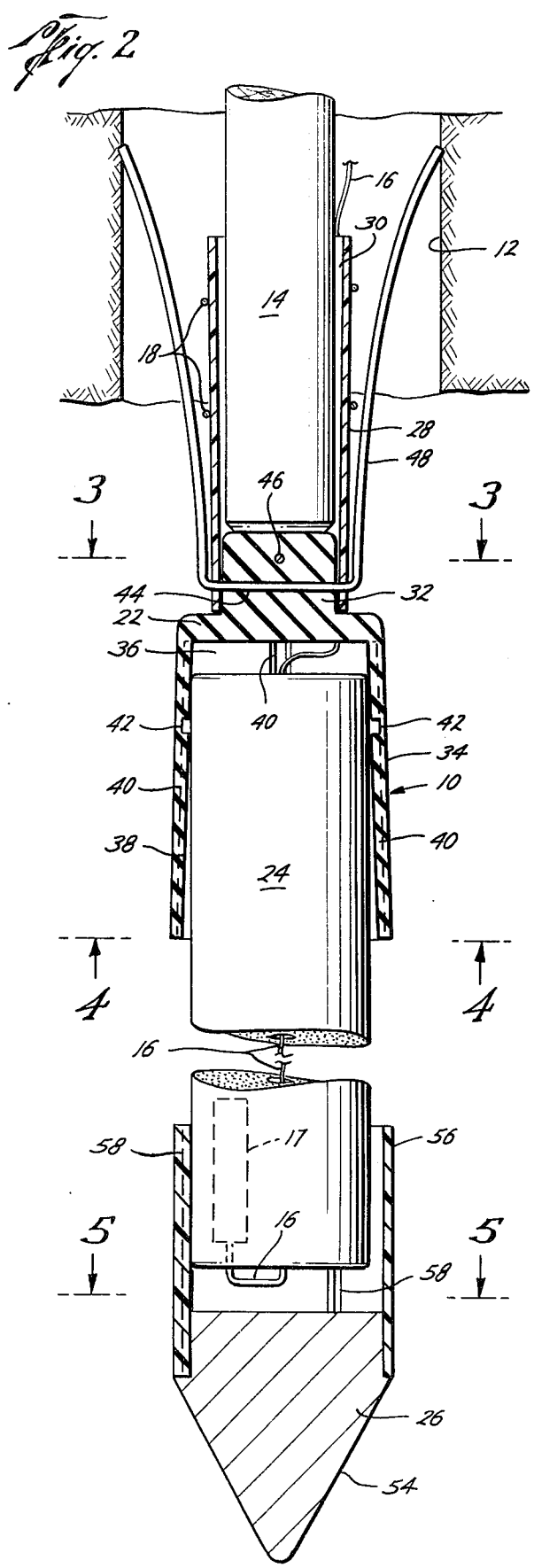

SEISMIC EXPLOSIVE CHARGE LOADER AND ANCHOR

BACKGROUND OF THE INVENTION

In geophysical exploration bore holes are drilled to different depths, explosive charges are placed and anchored in them at suitable depths and then exploded to produce reflected sound waves which are detected on the surface by geophones which identify particular waves and time the length of travel from the reflected source. Of major concern in geophysical exploration is the placement and anchoring of explosive seismic charges at desired depths in the bore holes.

Commercially available explosive charges at the present are packed in several types of containers. One of the popular type containers is an elongated metal cylindrical can which has a threaded pin and box so that the container can be screwed to another in end to end relation to form a charge of desired weight or length. These metal containers have a projecting circumferential rim at an end having the threaded box. Another type of container available to the trade is a smooth wall, cylindrical container, normally formed of a water repellent heavy paper-like material, which does not have any projections at either end of the container but has smooth cylindrical walls throughout its length.

While there are loaders which can be used for loading explosives in metal cans containing circumferential projections or rims, and loaders which can be used for loading explosives in smooth walled cylindrical packages without such a circumferential projection or rim, there is no seismic explosive charge loader available to the trade at the present time by which explosives in either of these containers can be satisfactorily loaded, placed and anchored in a bore hole in a safe and economical manner by one loader.

Patent art relating to seismic explosive cartridge units, loading and anchoring adaptors, and the like, include U.S. Pat. Nos. 2,535,196; 3,280,742; 3,075,424; 3,046,886; 3,150,590; and 3,208,381. A loader is sold to the trade by Specialties for Industry, Inc, of Jackson, Mississippi under U.S. Pat. No. 3,280,742. In addition, seismic explosive charge loaders have been used in the trade by the inventor which include inwardly and outwardly tapered griping ribs for griping smooth walled cylindrical containers without any circumferential projection or rim.

SUMMARY OF THE INVENTION

The present invention is directed to a seismic explosive charge loader which advantageously can be used for securely griping explosive charges contained in two forms of containers currently available on the market, that is the cylindrical can with a circumferential projection or rim at one end, and the smooth walled cylindrical package free of such a projection or rim.

More particularly, the present invention is directed to a seismic explosive charge loader comprising a unitary body having a first tubular member with an upwardly facing, internal recess of sufficient diameter to loosely receive a conventional loading pole or loading weight, a second tubular member having a downwardly facing internal recess and wall of sufficient internal diameter to fit about and receive an explosive charge container both with and without an outwardly extending circumferential projection or rim, and which includes a plurality of upwardly and inwardly tapering griping members on the wall which grip and hold the sides of the container which is free of the circumferential projection, and which ribs are provided with an internal and circumferentially extending groove which receives and grips the circumferential projection on the container having it. Thus, both forms of explosive containers are securely griped and held by the same loader.

The seismic explosive charge loader has a central body portion between the tubular members which is provided with one or more transversly extending openings through it to receive anchor members which extend through the openings and upwardly and outwardly for anchoring the loader in the bore hole.

Preferably there is an enlarged external shoulder on the lowermost tubular member provided with an opening through it into the downwardly facing internal recess for insertion of an explosive blasting cap and lead into the recess.

A more detailed description of the seismic explosive charge loader will be found under the heading "Description of Presently Preferred Embodiments."

Accordingly, it is an object of the present invention to provide a relatively inexpensive seismic explosive charge loader which effectively grips and holds containers for explosive charges currently available on the market and by which they can be lowered into and anchored in a bore hole at a desired depth safely and effectively.

A further object of the present invention is the provision of a seismic explosive charge loader which will securely grip and hold available forms of explosive charges currently on the market, which is simple, effective and economical to make, and which may be used with conventional loading equipment in the trade.

A further object of the present invention is the provision of a seismic explosive charge loader which has an upwardly facing internal recess which loosely receives wooden loading poles or loading weights normally used in the trade, and which has a downwardly facing internal recess provided with upwardly and inwardly tapered griping members having circumferential extending grooves so that both smooth walled containers free of circumferential projection and containers having circumferential projections, such as metal cans which are screwed together in end to end relation, are securely griped and held by the loader to assure safe placement of the explosive charge at the desired depths.

Other and further objects, features and advantages of the invention will appear from the Abstract of the Disclosure, the Background of the Invention, this Summary, the Drawings, the Description of the preferred Embodiments and the Claims.

BRIEF DESCRIPTION OF THE DRAWINGS

FIG. 1 is a side elevational view illustrating the seismic explosive charge loader shown positioning an explosive charge contained in a smooth-walled container free of a circumferential rim in a bore hole.

FIG. 2 is an enlarged, side elevational view, partly in section, of the seismic explosive charge loader illustrated in FIG. 1.

DESCRIPTION OF PRESENTLY-PREFERRED EMBODIMENTS

Figure 3:
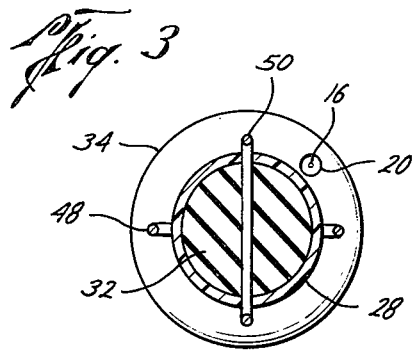
FIG. 3 is a cross-sectional view along with the line 3—3 of FIG. 2.

Referring now to the drawings, and particularly to FIG. 1, the seismic explosive charge loader is generally designated by the referenced numeral 10 and is illustrated being pushed down in the bore hole 12 by means of the loading poles 14 extending to the surface although other loading means may be used, such as loading weights, not show. As is customary, an explosive blasting cap lead, such as the electric wire 16, is lowered into the bore hole 12 and the pole 14 pushes the explosive charge loader 10 into the bore hole. Customarily, the wire 16 is formed into two half hitches 18 around the upper cylinder or tubular member 28 in order to support the loader 10 without pulling on the blasting cap 17 in the explosive charge in the container 24, which explosion lead 16 passes through an opening 20 (FIG. 3) in the upwardly-facing shoulder 22 of the loader 10. The explosive charge contained within the generally cylindrical container 24 is securely griped by the loader 10, and is provided with a nose cap or guide member 26 secured to the bottom portion of the explosive charge container 24.

Referring now to FIG. 2, the seismic explosive charge loader 10 includes the first generally tubular member 28 which is provided with an upwardly-facing internal recess 30 of sufficient diameter to loosely receive the loading pole 14. The first tubular member 28 is secured to or fabricated with a central body portion 32 which has a second generally tubular member 34 having the downwardly facing internal recess of sufficient internal diameter to fit about and to receive the explosive charge container 24. The second tubular member 34 is enlarged diametrically with respect to the first tubular member 28 and provides the enlarged external shoulder 22 on the second tubular member which extends outwardly of the first tubular member 28 and which is provided with the apperture or opening 20 FIG. 3) through which the blasting cap 17 is inserted and the explosive lead or wire 16 extends, as previously mentioned.

Figure 4:
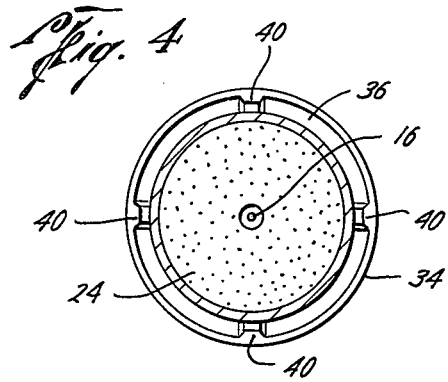
FIG. 4 is a cross-sectional view taken along the line 4—4 of FIG. 2.
Figure 5:
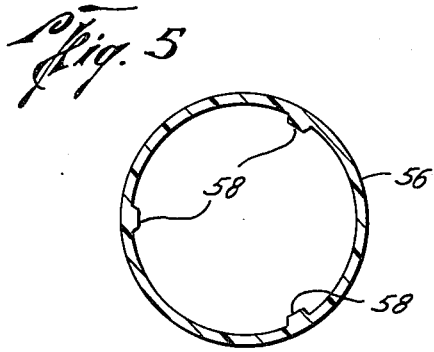
FIG. 5 is a cross-sectional view taken along the line 5—5 of FIG. 2.

The inner wall 38 of the second tubular member 34 which forms the downwardly facing internal recess 36 is provided with a plurality of griping ribs 40, as best illustrated in FIG. 4, which are upwardly and inwardly tapered so that they securely grip and hold smooth sides of the cylindrical walls of the container 24 for the explosive charge. The ribs 40 are made of a resilient material so that they grip and securely hold the smooth sides of the explosive container 24. Preferably, the central member 32, second tubular member 34 and the ribs 40 are all made of a resilient plastic material, of which many are available on the market. There may be any number of griping ribs 40, here shown as 4, and the griping ribs 40 may take any desired configuration, here shown as extending axially the length of the second tubular member 34. It is only necessary that the griping ribs permit insertion of the explosive container 24 into the internal recess 36 of the second tubular member 34 and securely grip and hold smooth side walls thereof.

The griping ribs 40 are provided with internally and circumferentially extending grooves 42 for receiving a circumferential projection, such as the rim of a can type explosive container, as later described. When a smooth walled cylindrical container free of any such circumferential projection or rim, is inserted into the internal recess 36, the container simply passes on up and beyond the circumferential grooves 42 and the griping ribs 40 securely grip the container 24.

Still with reference to FIG. 2, the central portion 32 of the loader 10 is provided with the diametrically extending openings 44 and 46 through which extend anchor members 48 and 50, respectively, which preferably are made from spring wire like material, and which extend upwardly and outwardly into engagement with the walls of the bore hole 12 to anchor the seismic explosive charge loader 10 in the well bore 12 and to prevent its removal therefrom when the loading poles 14 are withdrawn to the surface preparatory to exploding the explosive charge 24.

A nose cap or guide member 26 provided with the downwardly and inwardly tapering walls 54 and upwardly extending tubular wall 56 and griping ribs 58 is secured at the bottom portion of the explosive container 24.

In explosive containers of the type illustrated in FIG. 2 and indicated by the referenced numeral 24, a central opening is provided through which the explosive lead 16 extends from the top to the bottom and a recess is provided in the bottom into which is placed the blasting cap 17 which is secured to the lower end of the explosive lead or wire 16. The nose cap 26 protects the bottom of the explosive container 24, keeps the blasting cap 17 in place, and guides the container 24 downwardly in the bore hole 12.

In using the seismic explosive charge loader 10 to load a bore hole 12 with the smooth walled explosive container 24, such as illustrated in FIGS. 1 - 5, the electric blasting cap 17 with the wire lead 16 attached to it are placed through the opening 20 in the shoulder 22 of the second tubular member 34 and then passed through the prepared passage in the center of the explosive charge in its container 24 and the blasting cap 17 is inserted up into the receptacle at the lower end of the charge, as illustrated. The nose cap or guide member 26 is then forced on the lower end of the explosive charge container 24. The explosive charge container 24 is then inserted into the internal recess 36 of the second tubular member 34 until a tight fit is obtained. The wire lead 16 is then pulled back through the opening 20 until tight and then the two half hitches 18 are tied around the first or upper tubular member 28. The anchor wires 48 and 50 are inserted through the appertures 44 and 46 of the first or upper tubular member 28 and are bent upwardly. The seismic explosive charge loader is now assembled and ready to lower into the bore hole 12. A wooden dynamite pole 14, or other loading means such as a loading weight, is placed in the upwardly facing internal recess 30 of the upper tubular member 28 and the assembled loader is gently pushed downwardly into the bore hole 12. The operator while playing out the explosive lead wire 16 and adding additional loading poles in the usual manner, lowers the explosive charge loader 10 to the desired depth in the bore hole 12. The loading poles 14 are then pulled out of the bore hole from the surface and are easily removed from the first tubular member 28. The seismic explosive charge loader 10 is securely anchored in the bore hole 12 by means of the anchor members 48 and 50 digging into the side walls and preventing upward movement of the loader 10. At the time desired, the explosive charge in the explosive container 24 is exploded by actuation from the surface, not shown, and seismic readings are taken in the usual manner, also not shown.

Figure 7:
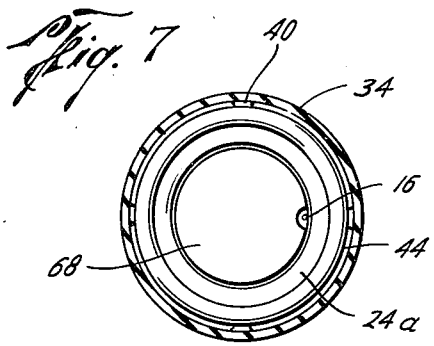
FIG. 7 is a cross-sectional view taken along line 7—7 of FIG. 6.
Figure 6:
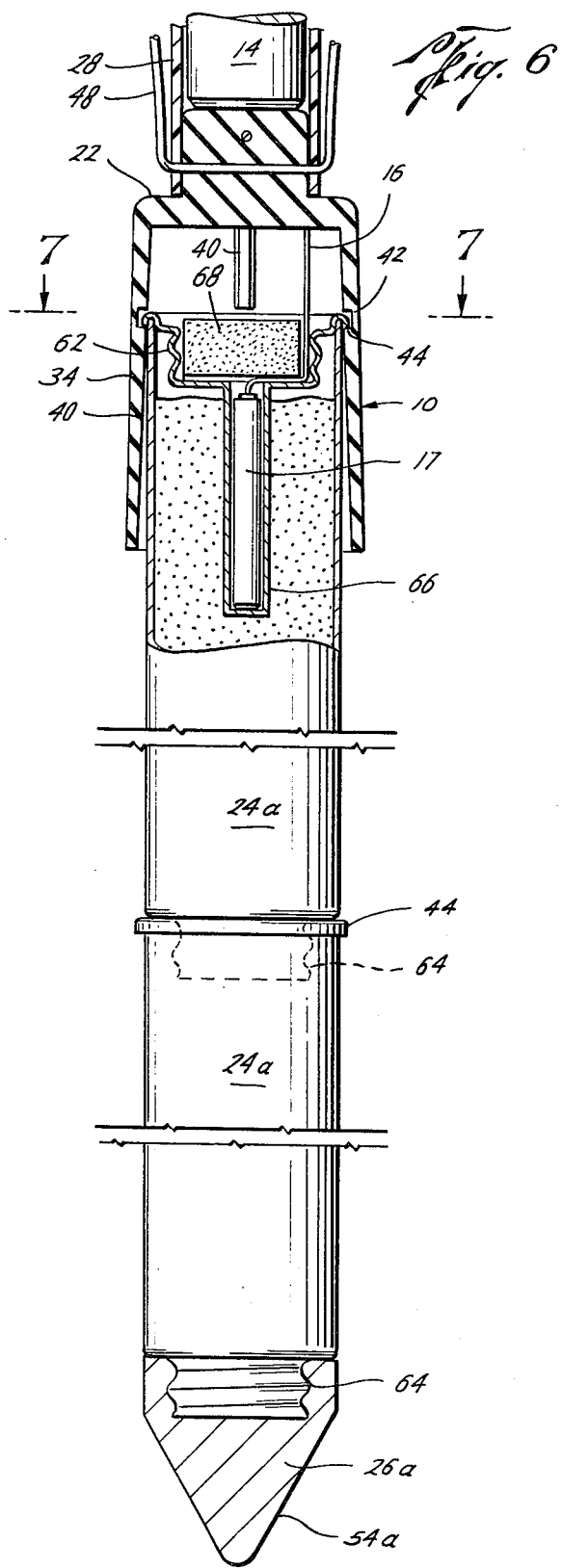
FIG. 6 is a side elevational view, with parts broken away similar to that of FIG. 2, illustrating the seismic explosive loader griping and securely holding a can type container with a circumferential projection or rim.

When using the loader 10 with a can type explosive container, such as illustrated in FIGS. 6 and 7, to which reference is now made, the circumferential projection or rim 44 of the can container 24a snaps into the circumferential grooves 42 of the ribs 40, thereby securely griping and holding the can type container 24a. The use and operation is the same as that described in connection with the smooth wall container 24 free of the circumferential projection for rim as illustrated in FIGS. 1–5. The assembly of the can type container 24a, however, is different from that of the smooth walled type due to the difference in the explosive container arrangement itself.

With reference to FIG. 6, the can type explosive container 24a is provided with the threaded box 62 at its upper end and the threaded pin 64 at the lower end which is received in the threaded box of the next succeeding can 24a so that any number of cans of these explosives can be secured together as desired. In the upper portion of the can 24a an elongated cylindrical receptacle 66 is provided to receive the blasting cap 17 secured to the explosive lead or wire 16, as illustrated in FIG. 6. Also, when utilizing explosive cans, such as illustrated by the referenced numeral 24a, a disk of porous material 68 is placed in the uppermost threaded box 62 to maintain the blasting cap 60 firmly in place in the receptacle 66.

The guide or nose member 26a is illustrated as attached to the lowermost portion of the explosive can 24a, to facilitate loading the explosive charge in the borehole, but it may be omitted if the operator so desires.

If desired, the body of the seismic explosive charge loader may be molded as a unit, or may be made in parts and secured together as desired, such as by gluing and the like. Preferably, the body is made of a high impact plastic which has sufficient resiliency to yieldingly grip the sides or rim of the explosive container, as previously described. Also, any type of anchoring means may be utilized to anchor the loader in the bore hole and to prevent it from being withdrawn from the bore hole.

From the foregoing, the present invention provides a relatively inexpensive, safe seismic explosive charge loader and anchor which may be utilized readily with forms of conventional packaged seismic explosives and loading equipment currently available to the trade. Accordingly, the present invention attains the objects and ends and has the advantages and features as mentioned as well as others therein.

While presently-preferred embodiments have been given for the purpose of disclosure, changes may be made which are within the spirit of the invention as defined by the scope of the appended claims.

What is claimed is:

1. A seismic explosive charge loader comprising,
   a first tubular member having an upwardly-facing, internal recess of sufficient diameter to loosely receive a loading means,
   a second tubular member having a downwardly-facing internal recess and a side wall of sufficient internal diameter to fit about and to receive a generally cylindrical explosive charge container having an outwardly extending circumferential projection and an explosive charge container free of such a projection, and
   a plurality of upwardly and inwardly tapered griping members on an internal wall of the side wall arranged to grip and hold sides of the container free of the circumferential projection,
   the ribs being provided with an internally and circumferentially extending groove arranged to receive and grip the circumferential projection on the container having it.

2. The seismic explosive charge loader of claim 1, including,
   a central body portion disposed between the first and the second tubular members provided with at least one transversly extending opening therethrough, and
   anchor means arranged to extend through the opening and upwardly and outwardly of the central body portion for anchoring the loader in a bore-hole.

3. The seismic explosive charge loader of claim 1 including,
   an enlarged external shoulder on the second tubular member providing a shoulder extending outwardly of the first tubular member,
   the shoulder provided with an opening through it into the internal recess of the second tubular member for insertion of an explosive blasting cap and lead thereinto.

4. The seismic explosive charge loader of claim 1 including,
   a central body portion disposed between the first and the second tubular members provided with at least one transversly extended opening therethrough,
   anchor means arranged to extend through the opening and upwardly and outwardly of the body portion for anchoring the loader in a bore-hole, and
   an enlarged external shoulder on the second tubular member extending outwardly of the first tubular member,
   the shoulder provided with an opening therethrough into the interal recess of the second tubular member for insertion of an explosive blasting cap and lead thereinto.

5. The seismic explosive charge loader of claim 4, where,
   the anchor means are spring wire members.

6. The seismic explosive charge loader of claim 1, including,
   anchor means extending upwardly and outwardly of the loader for anchoring the loader in the well bore.

* * * * *